United States Patent [19]

Dahn et al.

[11] Patent Number: 4,959,282
[45] Date of Patent: Sep. 25, 1990

[54] CATHODE ACTIVE MATERIALS, METHODS OF MAKING SAME AND ELECTROCHEMICAL CELLS INCORPORATING THE SAME

[75] Inventors: Jeffery R. Dahn, Surrey; Brian M. Way, North Vancouver, both of Canada

[73] Assignee: Moli Energy Limited, Canada

[21] Appl. No.: 217,668

[22] Filed: Jul. 11, 1988

[51] Int. Cl.$^5$ .................... H01M 4/50; C01G 45/00; C01D 15/00
[52] U.S. Cl. .................... 429/224; 423/49; 423/179.5; 423/605; 423/641
[58] Field of Search .............. 423/49, 179.5, 201, 423/605, 641; 429/224

[56] References Cited

U.S. PATENT DOCUMENTS

| | | | |
|---|---|---|---|
| 4,312,930 | 1/1982 | Hunter | 429/194 X |
| 4,379,817 | 4/1983 | Kozawa | 429/194 X |
| 4,399,202 | 8/1983 | Ikeda et al. | 429/194 X |
| 4,465,747 | 8/1984 | Evans | 429/224 X |

FOREIGN PATENT DOCUMENTS

| | | |
|---|---|---|
| 2058910 | 5/1972 | Fed. Rep. of Germany. |
| 59-31182 | 7/1984 | Japan. |
| 62-20250 | 1/1987 | Japan. |
| 61-16473 | 5/1987 | Japan. |
| 62-108455 | 5/1987 | Japan. |
| 62-126556 | 6/1987 | Japan. |

OTHER PUBLICATIONS

Dampier, "The Cathodic Behavior of CuS, MoO$_3$, and MnO$_2$ in Lithium Cells", J. Electrochem. Soc., vol. 121, No. 5, pp. 656-660 (1974).
Acta Chemica Sinica, vol. 39, No. 8, pp. 711-716 (3/1988).
Kozawa, "On an Ion-Exchange Property of Manganese Dioxide", J. Electrochem Soc., vol. 106, pp. 552-556 (1959).

Primary Examiner—Stephen J. Kalafut
Attorney, Agent, or Firm—Lerner, David, Littenberg, Krumholz & Mentlik

[57] ABSTRACT

Cathode-active material for electrochemial cells is prepared by reacting gamma phase MnO$_2$ with Li. The molar ratio of Li to MnO$_2$ is about 0.33 to about 0.43.

19 Claims, 1 Drawing Sheet

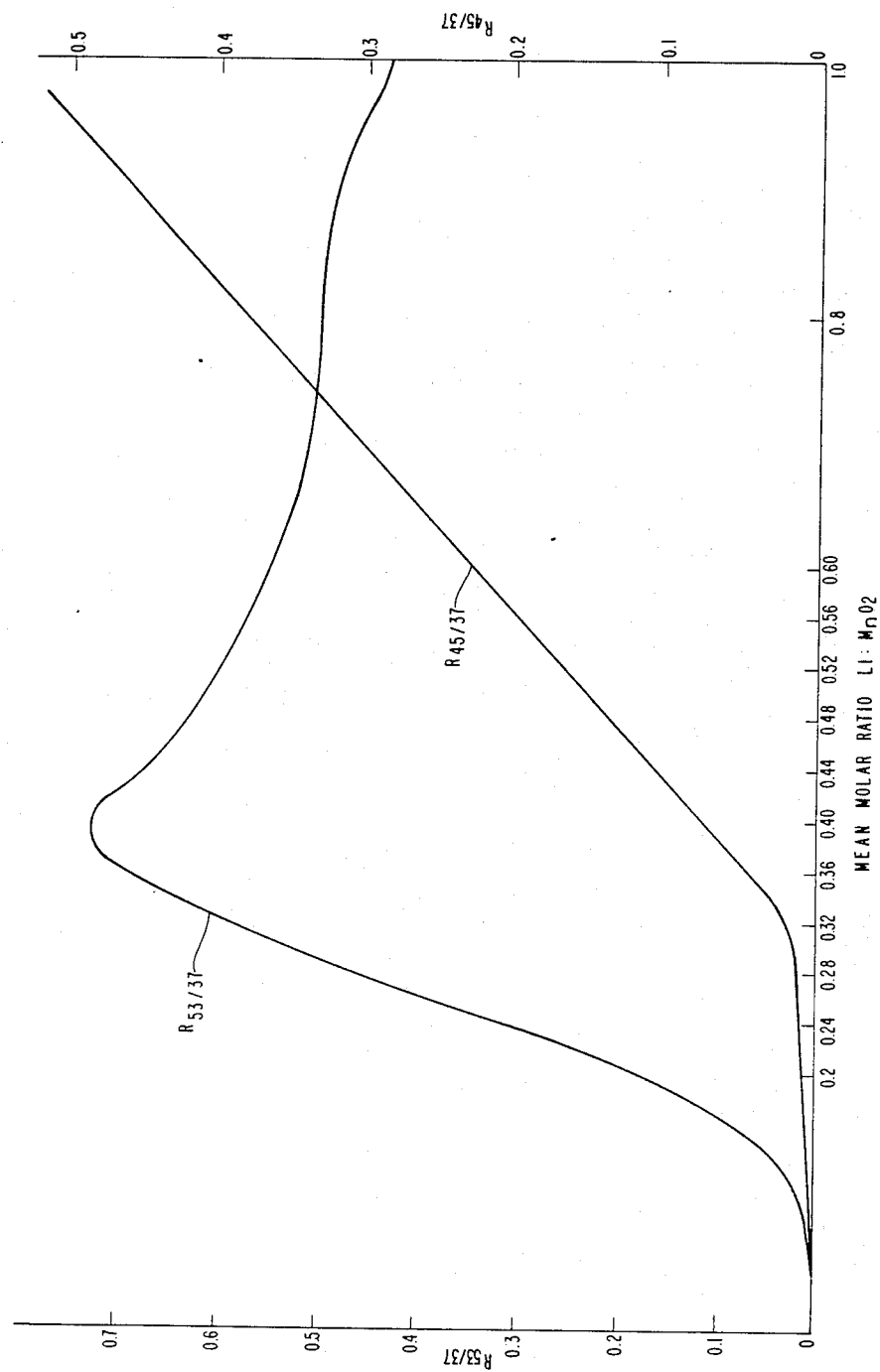

CATHODE ACTIVE MATERIALS, METHODS OF MAKING SAME AND ELECTROCHEMICAL CELLS INCORPORATING THE SAME

BACKGROUND OF THE INVENTION

The present invention relates to lithiated manganese dioxides, to methods of making such materials and to electrochemical cells incorporating the materials as cathode-active materials.

Electrochemical cells useful as electrical storage batteries usually incorporate a metallic anode and a cathode including an active material which can take up ions of the metal. An electrolyte incorporating ions of the metal is disposed in contact with the anode and the cathode. During discharge of the cell, metal ions leave the anode, enter the electrolyte and are taken up in the active material of the cathode, resulting in release of the electrical energy. Provided that the reaction between the metal ions and the cathode active material is reversible, the process can be reversed by applying electrical energy to the cell. If such a reversible cathode-active material is provided in a cell having the appropriate physical configuration and an appropriate electrolyte, the cell can be recharged and reused. Rechargeable cells are commonly referred to in the battery art as "secondary" cells.

It has long been known that useful cells can be made with an anode of a light alkaline metal such as sodium, potassium and, particularly, lithium, and a cathode-active material which is a sulfide or oxide of a transition metal, i.e., a metal capable of assuming plural different valence states. Dampier, "The Cathodic Behavior of CuS, $MoO_3$, and $MnO_2$ in Lithium Cells", J.Electrochem. Soc., Vol. 121, No. 5, pp. 656–660 (1974) teaches that a cell incorporating a lithium anode and a manganese dioxide cathode-active material can be used as an electrical power source. The same reference further teaches that a lithium and manganese dioxide cell can serve as a secondary battery. It is common knowledge that water reacts violently with the reactive alkaline metals, and hence is regarded as undesirable in any component of a cell having an alkaline metal anode.

West German OLS No. 2 058 910 teaches that the ion exchange capability of manganese dioxide can be enhanced by pretreating the manganese dioxide with lithium ions, as in an aqueous solution of LiOH so as to saturate the manganese dioxide with Li and then baking the saturated $MnO_2$ at a temperature of about 450°–500° C. for about 3–6 hours. The amount of Li used in the saturation step is said to be about 5.75–6.10 milliequivalents per gram, i.e., about 0.50 to about 0.53 moles Li per mole $MnO_2$. Acta Chemica Sinica, Vol. 39, No. 8, pp. 711–716 discloses a similar procedure applied to another form of $MnO_2$ referred to as electrolytic $MnO_2$, and likewise suggests that the procedure results in an ion exchange material having enhanced ion exchange capabilities and good reversibility. The formula of the ion exchange material is given as "$LiMn_2O_4$". Although these ion-exchange teachings do not specifically refer to use of $MnO_2$ as a cathode active material in an electrochemical cell, it has long been known that the ion exchange properties of a material such as manganese dioxide are closely related to its performance as a cathode active material in a cell. This relationship is disclosed, for example, in Kozawa, "On an Ion-Exchange Property of Manganese Dioxide", J. Electrochem Soc., Vol. 106, pp. 552–556 (1959).

In consonance with these teachings, Hitachi Maxell KK, Japanese patent publication 59-31182 (1984) teaches a non-aqueous electrolyte primary battery having a light metal anode and a cathode-active material of manganese dioxide which has been soaked in a solution of a light metal ion such as a lithium hydroxide solution and then heat-treated at about 200° to about 400° C., preferably at about 300° C. The '182 publication notes that manganese dioxide generally contains a substantial amount of adhering or bound water, and that heat treatment at elevated temperatures serves to drive off this water and hence improves the discharge performance and shelf stability of a non-aqueous $Li/MnO_2$ cell. The '182 publication states that manganese dioxide subjected to such heat treatment may undergo undesirable changes upon heat treatment but that the presence of metal ions in the $MnO_2$ during heat treatment controls these changes. The '182 publication further states that the beneficial effect of the metal component is particularly pronounced in the case of electrolytic gamma phase manganese dioxide. The Hitachi '182 disclosure does not specifically mention the use of the treated $MnO_2$ as a cathode active material in a secondary battery.

Other, more recent publications dealing with a cathode-active material containing both lithium and manganese dioxide have been directed towards secondary battery applications. Matsushita, Japanese patent application laid open (Kokai) 62-20250 (1987) discloses preparation of a lithiated manganese dioxide of the general formula $Li_yMnO_2$ by a route which does not involve lithium treatment of existing $MnO_2$. Instead, the '250 publication proposes synthesis of a lithium-potassium permanganate of the general formula $(1-x)K \cdot xLi \cdot MnO_4$, followed by thermal decomposition of the permanganate. The '250 publication teaches that decomposition products having stoichiometric formulas between $Li_{0.3}MnO_2$ and $Li_{0.8}MnO_2$ provide good resistance to loss of cycling capacity upon repeated charge and discharge cycles in the battery. Sanyo, Japanese Kokai 62-108455 (1987) describes a secondary battery having a cathode-active material including lithiumdoped gamma phase electrolytic manganese dioxide prepared according to the same general scheme as employed in the Hitachi '182 publication. Thus, Sanyo '455 teaches immersion of electrolytic manganese dioxide particles in one molar lithium hydroxide solution and heating to the boiling point of the solution, followed by repeated additions of more lithium hydroxide solution and repeated boiling. Following this immersion and boiling treatment, the $MnO_2$ particles are washed in water and then heat treated at between 350° to about 430° C. for two hours or more. The resulting cathode-active material is characterized as having the desirable gamma type crystalline structure, as being substantially free of moisture and as providing good cycling characteristics. Sanyo, Japanese Kokai 61-16473 (1987) suggests conducting aqueous LiOH treatment of $MnO_2$ at a superatmospheric pressure and at a temperature above 100° C., typically, 180° C. Toshiba, Japanese Kokai 62-126556 (1987) teaches treatment of the particulate $MnO_2$ in excess LiOH solution with stirring at about 60° C. followed by filtering and drying at 100° C. with subsequent heat treatment at 350° C. for 24 hours. Toshiba '556 teaches that the discharge capacity of a battery (apparently a primary battery) made using the sotreated $MnO_2$ can be optimized by selecting an LiOH solution of 0.05 to 0.02 molar concentration for use in the liquid phase treatment step. Toshiba '556 attributes this effect to the absence of sufficient lithium ions in solution below 0.05 molar and formation of a "colloidal" surface on the $MnO_2$ particles if the lithium solution concentration exceeds 0.2 molar.

Thus, there has been considerable effort by prominent industrial companies in the battery field directed towards development of cathode-active materials including both Li and $MnO_2$. There has been a significant commercial incentive for these efforts. Both lithium and manganese dioxide are relatively inexpensive, readily obtainable materials, offering the promise of a useful, potent battery at low cost.

Despite all of this effort, there have been unmet needs heretofore for further improvements in processes for making cathode-active materials, in cathode-active materials and in cells incorporating these materials.

SUMMARY OF THE INVENTION

The present invention addresses these needs.

One aspect of the present invention provides a method of making a cathode active material including the step of providing a substantially dry intermediate material comprising Li and gamma-phase $MnO_2$ in intimate admixture, the intermediate material having a mean molar ratio of Li to $MnO_2$ about 0.33 to about 0.43 more preferably about 0.36 to about 0.40 and most preferably about 0.38. The local molar ratio of lithium to $MnO_2$ desirably is substantially uniform throughout the intermediate material. The method further includes the step of heat treating the intermediate at a temperature above about 300° C., preferably below about 450° C.

Preferably, the gamma phase $MnO_2$ treated is a particulate, electrolytic $MnO_2$. The step of providing the intermediate most preferably includes the steps of contacting the $MnO_2$ with a solution of a lithium compound such as lithium hydroxide in a solvent such as water so as to form a slurry of $MnO_2$ particles in the solution, and agitating the slurry while evaporating the solvent. The simultaneous agitation and evaporation desirably are continued until the particles are substantially devoid of free liquid solvent. The resulting intermediate material may be directly transferred to the heat treatment step without any subsequent or intervening liquid treatment such as washing or the like.

The foregoing aspect of the invention incorporates the discovery that the results achieved in heat treatment of gamma $MnO_2$ are particularly sensitive to the molar ratio of lithium to $MnO_2$, and that there is a distinct, narrow range for this variable. Systems employing higher or lower molar ratios yield inferior materials. It is believed that this effect arises from separation of the product into plural phases of differing compositions when lithium concentrations outside the optimum range are present during heat treatment. Moreover, the foregoing aspect of the present invention incorporates the recognition that the deficiencies in prior methods of making cathode-active materials arise at least in part from uneven distribution of lithium on the $MnO_2$. With such uneven distribution, some or all of the material subjected to heat treatment would have molar ratios outside of the optimum range, even if the mean molar ratio were, by chance, within the proper range.

Further aspects of the present invention provide improved cathode-active materials such as those made by the aforementioned methods, and electrochemical cells incorporating such cathode active materials together with a lithium anode and a non-aqueous electrolyte including lithium. The preferred cathode-active materials have the stoichiometric formula $Li_yMnO_2$ wherein y is between about 0.33 and 0.43, incorporate a characteristic "X-phase" structure and have values of $R_{53/37}$ above about 0.65. The term "X-phase" as further defined below refers to a particular crystal structure of the material, whereas the term $R_{53/37}$, as further defined below, denotes a cyrstallographic parameter related to the proportion of X-phase in the material. Preferred cells according to these aspects of the invention provide superior energy storage capabilities both when fresh and after repeated cycling.

The foregoing and other objects, features and advantages of the present invention will be more readily understood from the detailed description of the preferred embodiments set forth hereinbelow, taken in conjunction with the accompanying drawings.

BRIEF DESCRIPTION OF THE DRAWINGS

FIG. 1 is a graph depicting certain analytical data.

DETAILED DESCRIPTION OF THE PREFERRED EMBODIMENTS

A process according to one embodiment of the present invention utilizes gamma phase manganese dioxide as a starting material. The term "gamma phase" refers to the crystallographic structure of $MnO_2$. The preferred manganese dioxide has a porous structure and hence has a high ratio of surface area (including pore surfaces) to weight. Desirably, this ratio is above about 10 $m^2/g$, typically between about 30 $m^2/g$ and about 80 $m^2/g$ and most typically about 60 $m^2/g$. Porous, gamma phase manganese dioxide prepared by an electrolytic process and known in the trade as electrolytic manganese dioxide is preferred. The manganese dioxide employed in the present process desirably is in fine particulate form, and most preferably has a mean particle size between about 5 micrometers and about 30 micrometers.

In the first step of the process, the manganese dioxide is contacted with a solution incorporating lithium ions in a liquid solvent. This solution preferably is a basic solution such as a solution of LiOH or $Li_2O$ in water or a solution including a heat-labile lithium compound such as $LiNO_3$. The contacting step desirably is performed by mixing the lithium solution with the particulate manganese dioxide so as to form a slurry. The solvent is then evaporated from the slurry while continually agitating the slurry so as to provide the intermediate material. When the solution is initially contacted with the $MnO_2$, the solution penetrates into the pores of the $MnO_2$. As the solvent is evaporated, the lithium containing compound, typically lithium hydroxide, crystallizes both on the exposed outer surfaces of the manganese dioxide particles and also within the pores of the $MnO_2$. The evaporation and agitation steps are continued until the particles are substantially dry. As used in this disclosure, the term "dry" means devoid of a distinct liquid phase. By contrast, the term "anhydrous" means free of either liquid or bound water. As $MnO_2$ typically contains substantial adsorbed or bound water, the dry particles ordinarily will not be anhydrous at this stage of the process.

To provide an intermediate of uniform composition, it is important that all of the $MnO_2$ particles be exposed to substantially the same conditions of lithium concentration during the solvent evaporation step, and particularly at the end of this step. Therefore, it is important that agitation is continued up to the end of the evaporation step, i.e., up to at least the point where the particles are substantially dry.

The amount of lithium in the lithium-containing solution is selected so as to provide a mean molar ratio of Li to $MnO_2$ between about 0.33 and about 0.43 in the intermediate material. The mean molar ratio applies to a macroscopic batch or mass of material. In an ideal process, wherein the Li is perfectly distributed, the molar ratio in any given particle of the intermediate would be exactly equal to the mean molar ratio. The term "local molar ratio" as used herein refers to the molar ratio of Li to $MnO_2$ for a single particle. The degree to which an actual process deviates from the ideal process can be expressed in terms of the maximum difference between any two local molar ratios within the sample. Desirably, this difference is about 0.10 or less, more desirably about 0.05 or less, most desirably about 0.02 or less. Desirably, the local molar ratios for substantially all individual particles in the intermediate are between about 0.33 and about 0.43. The lithium-bearing solution used in the contacting step desirably is saturated or nearly saturated. More dilute solutions merely require a more prolonged evaporation step and hence increase the cost of the process. Ordinarily, a saturated solution of the lithium-containing compound incorporating enough lithium to provide the desired molar ratio will have sufficient volume to completely fill the pores of the $MnO_2$ and will cover the $MnO_2$ so as to provide thorough and complete contacting. If not, then a more dilute solution should be used so as to provide this minimum volume.

The dry intermediate material resulting from the contacting, agitation and evaporation steps is heat-treated at an elevated temperature under a drying atmosphere, i.e., an atmosphere capable of taking up water vapor. The atmosphere used in the heat treatment step may be oxidizing or inert. Strongly reducing atmospheres adversely affect the product. Air is preferred for reasons of economy. The temperature employed in the treatment step is above 300° C., desirably between 300° and 450° C., preferably between 355° and 385° C. and most preferably about 370° C. The intermediate material desirably is held at the heat treatment temperature for at least about 30 minutes and more preferably for at least about one hour, and then cooled to room temperature.

During the heat treatment step, bound water is driven off from the $MnO_2$. Additional water vapor may be generated by decomposition of the lithium-containing compound as the lithium is incorporated into the $MnO_2$ structure. This water is removed by the heat treatment atmosphere. During heat treatment the original gamma phase manganese dioxide crystal lattice is transformed into a new crystal lattice structure referred to in this disclosure as "X-phase" structure. The X-phase structure includes Li intercalated within the crystal lattice. The X-phase structure is similar to the gamma phase structure but is expanded along the a axis. Thus, gamma phase $MnO_2$ has lattice constants (in Angstroms) of a=4.45, b=8.8 and c=2.9. X-phase $Li_yMnO_2$ material resulting from the heat treatment step has lattice constants of a=approximately 4.91, b=8.8 and c=2.9. Under X-ray cyrstallographic examination, gamma phase $MnO_2$ has a distinct (221) peak at a diffraction angle (2 Theta) of 56° whereas the corresponding (221) peak for X-phase is at 53°. X-phase, gamma phase and beta phase $MnO_2$ all have a peak at 37.2°. This peak arises from the (021) plane in the gamma- and X-phases, and from the (011) plane in the beta phase. $Li_2MnO_3$, an impurity which can arise in the heat treatment step where excess lithium is present, also has an X-ray diffraction peak just below 37°, which overlaps the 37° peak of $MnO_2$. Thus, the ratio of the integrated intensity of the peak at 53° to the integrated intensity of the peak at 37° indicates the ratio of X-phase $Li_yMnO_2$ to other Mn-containing species in the product, and hence indicates the purity of the product. The term "integrated intensity of the peak" refers to the area under the curve of intensity versus diffraction angle.

The results observed in X-ray diffraction measurements, and particularly integrated intensity ratios, will vary with the instrument employed. All X-ray diffraction measurements referred to in this disclosure should be understood as referring to measurements taken at 21° C. using an instrument referred to herein as the "reference" instrument. The reference instrument employs the Bragg-Brentano geometry with powder samples applied to the surfaces of flat glass plates. The reference instrument has an automatic divergence slit which keeps the area of the sample illuminated with X-rays constant as the detector and sample angles change. The reference instrument has a curved graphite monochromator crystal on the detector arm, which removes Cu $K\beta$ radiation, and Mn fluorescence radiation from the diffraction profiles. The goniometer of the reference instrument is aligned so that the Si 311 peak is observed at 2 Theta=56.12° using Cu $K\alpha_1$ radiation. The angular variation of measured intensities on the reference instrument relative to other machines can be calculated by comparing measurements on standard materials. Polycrystalline silicon is one such material. The relative integrated intensities for polycrystalline silicon at 21° C. in the angular range of interest obtained using the reference instrument are given in Table I, below.

TABLE I

| Peak h k l | Angle 2 Theta degrees | Intensity Relative to 111 |
|---|---|---|
| 1 1 1 | 28.46 ($\alpha$) | 1.000 |
| 2 0 0 | 47.36 ($\alpha$) | 0.545 |
| 3 1 1 | 56.12 ($\alpha_1$) | 0.312 |

As used in this disclosure, the term "$R_{53/37}$" should be understood as referring to the ratio of the integrated intensity of the diffraction peak at 53° to the integrated intensity of the diffraction peak at 37.2°, including any portion of the intensity attributable to the $Li_2MnO_3$ peak slightly below 37°, if present. Samples showing no appreciable X-ray diffraction peaks for any known impurity have $R_{53/37}$ of approximately 0.76. No sample of a material has been found with $R_{53/37}$ greater than about 0.76. It is accordingly believed that $R_{53/37}$ of about 0.76 represents the value for pure X-phase $Li_yMnO_2$. The $R_{53/37}$ of the cathode active material according to the present invention desirably is about 0.6 or more, preferably about 0.65 or more, and more preferably, about 0.7 or more. $Li_2MnO_3$ has an X-ray diffraction peak at about 45°. As used in this disclosure, "$R_{45/37}$" means the ratio of the integrated intensity of the peak at 45° to the integrated intensity of the peak at 37.2°, including any portion of the intensity attributable to the peak slightly below 37°, if present. $R_{45/37}$ is a measure of the degree to which the product of the heat treatment step is contaminated with $Li_2MnO_3$. Desirably, this ratio is less than about 0.15, and more desirably about 0.10 or less.

The cathode-active material obtained as the product of the heat treatment step can be fabricated into a cathode structure by the techniques commonly utilized with other, particulate, cathode active materials. Thus, the cathode-active materials according to the present invention may be suspended in a volatile liquid carrier together with a polymeric binder such as polyethylene oxide, polytetrafluoroethylene or other fluoropolymers or a polymer of ethylene propylene diene monomer, commonly referred to as EPDM. This suspension may be coated on to a suitable backing such as a metallic current collector foil, and the solvent may be evaporated so as to set the binder and provide a coherent layer of cathode active material on the binder. Desirably, a chemically inert, particulate, electrically conductive material such as graphite is incorporated in the suspension and hence interspersed with the active material of the cathode structure in the conventional manner.

The cathode may be assembled in the conventional manner with a lithium-containing anode and with an electrolyte incorporating lithium ions to form a cell. Merely by way of example, the electrolyte may be a solution of a lithium salt in a non-aqueous liquid solvent. Suitable lithium salts include $LiAsF_6$, $LiPf_6$, LiI, LiBr, $LiBF_4$, $LiAlCl_4$, $LiCF_3Co_2$, $LiCF_3So_3$ and mixtures thereof. $LiPF_6$, LiI and $LiAsF_6$ and mixtures thereof are preferred, whereas $LiAsF_6$ is most preferred. Suitable electrolyte solvents include organic solvents such as propylene carbonate ("PC"), ethylene carbonate ("EC") and mixtures thereof with or without additional ingredients such as tetrahydrofuran and 2-methyl tetrahydrofuran The anode may be essentially pure lithium or may include an alloy of lithium with another metal such as aluminum. As disclosed in Canadian patent No. 1,190,279, the cell preferably incorporates means for applying pressure o the lithium anode at least during recharge.

The following, non-limiting examples set forth hereinbelow illustrate certain aspects of the invention:

EXAMPLE I

Electrolytic gamma phase $MnO_2$ having a mean particle size of about 25 microns is mixed with a saturated (approximately 5 N) aqueous solution of lithium hydroxide at room temperature to form slurries. The slurries incorporate differing amounts of the solution so as to provide differing mean molar ratios of lithium to $MnO_2$. Each slurry is stirred while heating in an open vessel under atmospheric pressure so as to evaporate water from the slurry at about 100° C. Both the stirring and evaporation are continued until the material is substantially dry. Substantial mixing power is required to maintain this continued agitation as the material approaches dryness. The dry, particulate intermediate resulting from the evaporation and agitation steps is placed in a conventional oven heated to 370° C. and held at 370° C. for one hour. The product resulting from the heating step for each sample is examined by X-ray diffraction. The results are as indicated in Table II, and as shown in FIG. 1.

TABLE II

| Sample | Mean Molar Ratio $Li:MnO_2$ | $R_{53/47}$ | $R_{45/37}$ |
|---|---|---|---|
| A | 0.000 | 0.000 | 0.000 |
| B | 0.145 | 0.061 | 0.000 |
| C | 0.289 | 0.494 | 0.010 |
| D | 0.360 | 0.687 | 0.075 |
| E | 0.431 | 0.676 | 0.088 |
| F | 0.500 | 0.557 | 0.243 |
| G | 0.573 | 0.618 | 0.161 |
| H | 0.715 | 0.508 | 0.482 |
| I | 0.859 | 0.507 | 0.286 |
| J | 1.000 | 0.433 | 0.533 |

The dependence of $R_{53/37}$ and $R_{45/37}$ on the molar ratio Li to $MnO_2$ (the subscript y in the formula $Li_yMnO_2$) is apparent from FIG. 1. Further, FIG. 1 illustrates the existence of a relatively narrow range of desirable y-values or molar ratios extending from about $y=0.33$ to about $y=0.43$.

EXAMPLE II

LiOH and particulate, gamma phase electrolytic $MnO_2$ are mixed to provide a mean molar ratio of Li to $MnO_2$ of 0.428. Distilled water is added to dissolve all of the LiOH, resulting in a slurry of $MnO_2$ in approximately a 5 molar LiOH solution. The entire slurry is transferred to a heated, high torque mixer and the water is evaporated from the solution while stirring. Stirring is continued until the powder is substantially dry. After heat treatment at 370° C. for one hour, the product has $R_{53/37}$ of about 0.7, and also has $R_{45/37}$ of about 0.1. The product is assembled with a lithium anode and an electrolyte of 1 M $LiAsF_6$ in a PC/EC solvent. The cell is tested by charging and discharging through a voltage range between about 2 volts and about 3.5 volts. The recharging current is employed to provide recharging over an hour period. On the first recharge cycle, the specific capacity of the cathode active material is 0.17 ampere-hours per gram. This specific capacity is maintained over many further charge/discharge cycles.

EXAMPLE III

The process of Example II is repeated, but using a molar ratio of Li to $MnO_2$ of 0.36. The product of the heat treatment step has $R_{53/37}$ of about 0.7 and $R_{45/37}$ of about 0.03. In the assembled cell, the product or cathode-active material has a specific capacity at first recharge of 0.17 ampere-hours per gram.

COMPARATIVE EXAMPLE IV

The process of Example II is repeated except that the stirring is terminated when the slurry is still a wet, thick mixture. This wet, thick mixture is placed into an oven at 370° C. Thus, the final stages of evaporation occur during the first few minutes of heating in the oven, without agitation. During this final stage of drying, without agitation, lithium redistributes inhomogeneously within the powder bed, apparently due to wicking and uneven evaporation from various portions of the bed After heat treatment, the product is visibly inhomogeneous. Visible deposits, apparently LiOH and $Li_2CO_3$ appear at the top of the powder bed. A sample taken from the middle of the bed has $R_{53/37}$ of 0 51 and $R_{45/37}$ of 0.176. In the cell, this product sample shows a specific capacity at first recharge of only 0.12 ampere hours per gram.

COMPARATIVE EXAMPLE V

Several batches of LiOH and $MnO_2$ are prepared by drying blending at various molar ratios Each sample is thoroughly ground, after mixing, in a mortar and pestle to a mean particle size of about 25 microns. The mixed, ground powders are pelletized in a die at high pressure. These pelletized intermediates are heat treated at 370° C. in air for one hour. The products are examined by X-ray diffraction and tested in assembled cells as in the preceding examples. The results are as indicated in Table III.

TABLE III

| Mean Molar Ratio $Li:MnO_2$ | $R_{53/37}$ | $R_{45/37}$ | Specific Capacity, A-h/g |
|---|---|---|---|
| 0.19 | .15 | 0.00 | .14 |
| 0.28 | .35 | 0.00 | .15 |
| 0.42 | .58 | 0.10 | .14 |
| 0.57 | .51 | 0.17 | .11 |

The foregoing description of the preferred embodiments should be taken as illustrating, rather than as limiting the present invention as defined by the claims. Numerous variations and combinations of the features described above can be utilized without departing from the present invention.

We claim:

1. A method of making a cathode active material for an electrochemical cell comprising the steps of providing a substantially dry intermediate including a lithium-containing compound and gamma $MnO_2$ at a mean molar ratio of lithium to gamma $MnO_2$ of about 0.33 to about 0.43 and heat-treating said intermediate in a drying atmosphere above about 300° C.

2. A method as claimed in claim 1 wherein said gamma $MnO_2$ in said intermediate is porous $MnO_2$ in particulate form.

3. A method as claimed in claim 2 wherein said heat-treating step is conducted at between about 300° C. and about 450° C. for at least about 30 minutes.

4. A method as claimed in claim 3 wherein said heat-treating step is conducted at about 355° to about 385° C. for at least about one hour.

5. A method as claimed in claim 2 wherein said step of providing said intermediate includes the steps of contacting said particulate $MnO_2$ with a solution of said lithium-containing compound in a solvent and evaporating said solvent from said particulate $MnO_2$ while agitating said particulate $MnO_2$.

6. A method as claimed in claim 5 wherein said said evaporation and agitation steps are continued at least until said particulate $MnO_2$ is substantially devoid of free liquid solvent.

7. A method as claimed in claim 6 wherein the dry intermediate material resulting from said evaporation step is transferred directly to said heat treating step.

8. A method as claimed in claim 6 wherein said solvent consists essentially of water.

9. A method as claimed in claim 8 wherein said lithium-containing compound is selected from the group consisting of LiOH, $Li_2O$ and $LiNO_3$.

10. A method as claimed in claim 9 wherein said lithium-containing compound consists essentially of LiOH.

11. A method as claimed in claim 2 wherein said providing step is conducted so that the mean molar ratio of Li to $MnO_2$ is about 0.36 to about 0.40.

12. A cathode-active material made by a process as claimed in claim 1.

13. A cathode-active material made by a process as claimed in claim 6.

14. A cathode-active material made by a process as claimed in claim 10.

15. An electrochemical cell comprising a lithium-containing anode, an electrolyte and a cathode-active material as claimed in claim 12.

16. A cathode-active material made by a process as claimed in claim 1 having a stoichiometric formula $Li_yMnO_2$, wherein y is about 0.33 to about 0.43, at least a portion of said material being X-phase, the material having $R_{53/37}$ of at least about 0.6.

17. A cathode-active material according to claim 16 having $R_{53/37}$ of at least about 0.7.

18. A cathode-active material according to claim having $R_{45/37}$ less than about 0.15.

19. An electrochemical cell comprising a lithium anode, an electrolyte and a cathode-active material as claimed in claim 16.

* * * * *

UNITED STATES PATENT AND TRADEMARK OFFICE
CERTIFICATE OF CORRECTION

PATENT NO.  : 4,959,282

DATED       : September 25, 1990

INVENTOR(S) : Dahn et al.

It is certified that error appears in the above-identified patent and that said Letters Patent is hereby corrected as shown below:

Column 7, line 42, delete "o" and insert therefor --on--.

Column 8, line 65, delete "0 51" and insert therefor --0.51--.

Column 10, line 41, after "claim", insert --16--.

Signed and Sealed this

Seventh Day of January, 1992

Attest:

HARRY F. MANBECK, JR.

*Attesting Officer*     *Commissioner of Patents and Trademarks*